United States Patent [19]

Akers et al.

[11] 4,337,209
[45] Jun. 29, 1982

[54] PROCESS FOR THE MANUFACTURE OF SOAP

[75] Inventors: John B. Akers, South Wirral; Jane A. Littler, Warrington; David C. Peters, Heswall, all of England

[73] Assignee: Internationale Octrooi Maatschappij "Octropa" B.V., Rotterdam, Netherlands

[21] Appl. No.: 225,623

[22] Filed: Jan. 16, 1981

Related U.S. Application Data

[63] Continuation-in-part of Ser. No. 119,225, Feb. 7, 1980, Pat. No. 4,259,251.

[30] Foreign Application Priority Data

Feb. 14, 1979 [GB] United Kingdom ................. 0529/79

[51] Int. Cl.$^3$ .......................... C11B 13/00; C11B 1/10
[52] U.S. Cl. ..................................... 260/417; 260/413; 260/414; 562/606
[58] Field of Search .................... 260/413 S, 414, 417; 562/606

[56] References Cited

U.S. PATENT DOCUMENTS

3,071,946  1/1963  Vantuyle ............................ 260/413
3,755,391  8/1973  Bertrand ............................ 260/414
4,235,794  11/1980  Rieber ................................ 260/414

*Primary Examiner*—John F. Niebling
*Attorney, Agent, or Firm*—Barry Kramer

[57] ABSTRACT

An alkali metal salt of an organic carboxylic acid, i.e. a soap, is prepared by saponifying the corresponding organic carboxylic acid, its ester or mixtures thereof with a concentrated aqueous solution of alkali metal hydroxide in the presence of an inorganic salt, in a liquid reaction medium comprising acetone, separating the organic salt from the reaction medium and removing excess acetone from the organic salt. The inorganic salt, i.e. soap, so produced is in the form of a dry finely divided powder.

8 Claims, No Drawings

PROCESS FOR THE MANUFACTURE OF SOAP

This application is a continuation-in-part application of Application Ser. No. 119,225 filed Feb. 7, 1980, U.S. Pat. No. 4,259,251.

The invention relates to a process for saponifying organic acids or esters thereof, especially fatty acid glyceride esters. More particularly, the invention relates to a process for the manufacture of soap and lubricating greases from free fatty acids, fats, oils and other lipid materials.

The preparation of alkali metal salts or organic acids by saponifying the corresponding organic acid esters, as in traditional soap-making processes, is usually carried out using an alkali metal hydroxide base, the organic acid ester, and water as the reaction medium. Such processes require heat energy to initiate and sustain the saponification reaction and heat energy to remove excess water from the products of saponification (soaps), which are otherwise normally sticky and intractable, and are not amenable to recovery by simple filtration.

It is well appreciated that energy costs in any industrial process can constitute a major proportion of the total costs of manufacturing a finished product. Any means whereby these energy costs can be proportionally reduced without sacrificing the quality or yield of the finished product can, therefore, contribute to the profitability of the process. This applies to the process of soap making where a reduction in the use of heat energy would reflect a considerable saving in the overall costs of manufactured soap.

It has been proposed by Ivanov et al in Seifen-Ole-Fette-Wasche, 102 (1976) No 16 at page 459 to saponify lipids using solid sodium hydroxide finely dispersed in a polar aprotic organic solvent, such as acetone, to yield soap powder, the glycerine and unsaponifiables remaining in the solvent. Ivanov claims that saponification is accompanied by phase separation of fatty acids, as sodium soaps, from glycerine and unsaponifiable matter without the need for additional liquid-liquid or liquid-solid extraction.

It has also been proposed in U.S. Pat. No. 4,075,234 (Peterson assigned to the Procter & Gamble Company) to prepare sodium and lithium salts of organic carboxylic acids by saponifying the corresponding organic carboxylic acid esters with a concentrated aqueous solution of sodium hydroxide or lithium hydroxide in a liquid reaction mixture comprising an alkyl nitrile, separating the salts so formed from the reaction mixture and removing the excess alkyl nitrile from these salts.

We have now discovered that soap in the form of a finely divided dry powder can be prepared by saponifying organic acids or esters thereof with a concentrated aqueous solution of an alkaline base, in the presence of a water-miscible organic solvent other than an alkyl nitrile, and an inorganic salt, at a lower temperature than is employed in traditional soap manufacture and without need to dehydrate the soap so produced before conversion into manufactured soap products.

It should be explained that the expressions "saponifying" and "saponification" are normally employed in describing the process of reacting an organic acid ester with an alkali metal hydroxide to form the corresponding alkali metal salt of the organic acid, i.e. soap. In the present specification, however, as will be made clean, soap can also be prepared by reacting an organic acid with an alkali metal hydroxide: this latter reaction is accordingly also described herein by the expressions "saponifying" and "saponification".

The new process accordingly can result in a considerable saving in energy costs as compared with traditional processes. Furthermore, we have found that soap prepared by the new process is more amenable to the production of manufactured soap products, such as soap tablets, than is experienced in traditional soap tablet manufacture. For example, the dry soap powder can if necessary readily be deodorised by heating under vacuum or in certain instances bleached by moderate heating without adversely affecting the soap itself. Traditionally manufactured "wet" soap cannot be so readily deodorised or bleached.

By employing a concentrated aqueous solution of an alkaline base, instead of a solid base as proposed by Ivanov et al, we have found that the rate and conduct of the saponification process is far easier to control and, more importantly, the soap obtained is not contaminated with the solid base as we have found from experience when examining under practical conditions the process proposed by Ivanov et al. Also, the presence of an inorganic salt results in an unexpectedly higher yield of soap powder.

We have also noted that the fats, fatty acids and other lipid material that can be employed in soap manufacture are more readily soluble in acetone than in an alkyl nitrile such as acetonitrile advocated by Peterson. It accordingly follows that acetone provides the better medium in which to conduct the saponification process.

The invention accordingly provides a process for the preparation of an alkali metal salt of an organic carboxylic acid, which process comprises saponifying the corresponding organic carboxylic acid, its ester or mixtures thereof with a concentrated aqueous solution of alkali metal hydroxide in the presence of an inorganic salt, in a liquid reaction medium comprising acetone, separating the organic salt from the reaction medium and removing excess acetone from the organic salt.

THE ORGANIC CARBOXYLIC ACID

The organic carboxylic acid that can be subjected to saponification according to the invention will normally be a straight chain or branched chain fatty acid having from 6 to 24 carbon atoms in the molecule. Usually a mixture of two or more such acids will be employed such as, for example, a mixture of free fatty acids resulting from the distillation or splitting of natural fats and oils.

Examples of commercially available mixtures of free fatty acids which can usefully be employed are:
Split and distilled tallow fatty acids,
Split and distilled palm fatty acids,
Split and distilled coconut fatty acids,
Acid oils of nut, vegetable and fish origin,
Condensates of volatile short chain ($C_6$ to $C_{10}$) acids from vacuum distillation of split fatty acids and
Undistilled residue from vacuum distilled split fatty acids.

THE ORGANIC CARBOXYLIC ACID ESTER

The organic acid ester that can be subjected to saponification according to the invention will normally be a simple alkyl or aryl ester, or mixtures thereof, or it can be glycerine ester such as a triglyceride which, especially in high grade materials, typically consitutes the major proportion of the materials present in fats and oils derived from animal or vegetable sources, as well as a mono- or di-glyceride or mixtures thereof with triglycerides. Specific non-limiting examples of animal or vegetable fats and oils include lard, tallow, coconut oil, palm oil, various by-products from animal rendering operations, oils from oleaginous seeds such as soybean, sunflower seed, cottonseed, and other oils and fats having a high acid value which is outside normal specification due to enzymatic and microbiological changes which have taken place.

Further examples of commercially available sources of oils and fats are given in Bailey's "Industrial Oil and Fat Products", 3rd Edition, Edited by D Swern (1964) at pages 153 to 164.

According to one embodiment of the invention concerning the preparation of soap for use in lubricating greases, the organic acid esters are preferably $C_6$ to $C_{24}$ alkyl organic acid esters.

According to another embodiment of the invention concerning the preparation of industrial or domestic soaps, the organic acid esters are preferably $C_6$ to $C_{20}$, most preferably $C_{12}$ to $C_{18}$ alkyl organic acid esters.

The reaction does not appear to depend upon the nature of the organic acid or ester thereof used; hence, alkali metal salts of organic acids having chain lengths shorter or longer than mentioned above, as well as branched chain and aryl organic acids, can also be prepared by the process of the invention by saponification of the corresponding organic acid or ester thereof.

THE INORGANIC SALT

An inorganic salt is also employed in the process of the invention in order to increase the rate of saponification and the yield of soap obtained. The preferred salt is an alkali metal halide, sulphate or phosphate.

The preferred salts in increasing order of effectiveness in terms of the percent yield of soap obtained are lithium chloride, sodium acetate, sodium tripolyphosphate, sodium chloride, sodium sulphate and sodium iodide.

For reasons of economy and freedom from discolouration of soap, the preferred salts are sodium tripolyphosphate, sodium chloride and sodium sulphate.

Other inorganic salts or mixtures of the above salts with other inorganic salts can also be employed.

The amount of inorganic salt employed will usually comprise from 0.01 M to 2 M expressed in terms of the organic acid or ester thereof to be saponified. Expressed in practical terms, the amount of inorganic salt employed will usually comprise from 1 to 10%, preferably from 2 to 5% by weight of the organic acid or ester thereof to be saponified.

THE ALKALI METAL HYDROXIDE

The alkaline metal hydroxide to be employed will be sodium hydroxide or potassium hydroxide or lithium hydroxide, or mixtures thereof. The amount of the hydroxide to be incorporated in the reaction mixture will depend on the amount of organic acid present and its Acid Value, or on the amount of organic acid ester present and its Saponification Value.

The Acid Value is defined as the number of milligrams of potassium hydroxide required exactly to neutralise the free acidity in 1 gram of the organic acid ester. The Acid Value can be determined by the method described in "The Industrial Chemistry of the Fats and Waxes" by Hilditch (1949) at page 43.

The Saponification Value is defined as the number of milligrams of potassium hydroxide required for complete saponification of 1 gram of the organic acid ester. The Saponification Value can be determined by the method described in "The Industrial Chemistry of the Fats and Waxes" by Hilditch (1949) at page 42.

The amount of alkali metal hydroxide employed in order to saponify completely the organic acid or ester can accordingly be calculated respectively from the Acid Value of the acid or the Saponification Value of the ester and will in theory be the stoichiometric amount. In practice, however, it is preferred to employ slightly less than the stoichiometric amount of the hydroxide in order to ensure that the soap that is formed is not contaminated with unused hydroxide. Ideally, the amount of hydroxide employed can be considerably less than the stoichiometric amount, for example as little as 50% of the stoichiometric amount, any unsaponified organic acid or ester remaining in solution in the acetone being separated and recovered, and, if desired, added to further organic acid or ester for subsequent saponification. It is to be understood, however, than an amount of alkaline base in excess of the stoichiometric amount, for example, up to 10% more than the stoichiometric amount, can be employed if complete saponification of the organic acid or ester is to be achieved.

The concentration of the aqueous alkali metal hydroxide solution to be employed is dependent on the solubility of the chosen base in water. For example, when the hydroxide is sodium hydroxide, the concentration of the aqueous sodium hydroxide solution employed should be at least 20% by weight, and is preferably as high as 50% by weight or even higher. The ideal solution to be employed contains about 40% by weight of sodium hydroxide. When, on the other hand, the hydroxide is lithium hydroxide, the concentration of the aqueous lithium hydroxide solution employed should be at least 7% by weight, preferably as high as 17% by weight, which is close to a saturated solution of lithium hydroxide in water.

THE LIQUID REACTION MEDIUM

The liquid reaction medium in which the saponification reaction is conducted comprises acetone in an amount sufficient to dissolve most or all of the organic acid or ester thereof. The liquid medium will also comprise at least a minor amount of water, most of which will be derived from the aqueous alkali metal hydroxide which is added to initiate the saponification reaction. Accordingly, the amount of water present in the liquid reaction medium will normally be at least sufficient to keep the hydroxide in solution while saponification proceeds. It is important to ensure that the hydroxide is not permitted to precipitate during this reaction and so contaminate the soap that is formed. It is also important to ensure that the amount of water present in the reaction mixture is not excessive, such that the soap formed as a result of saponification does not lose its grainy, powdery character and become sticky and intractable due to excessive hydration.

It follows that the amount of water in the reaction mixture will depend upon the water solubility of the alkaline base employed, but in general terms it should not normally exceed 10%, preferably not in excess of 5% by weight of the total reaction mixture.

THE PROCESS

In carrying out the process of the invention for the preparation of an alkali metal salt of an organic carboxylic acid, the organic carboxylic acid or its ester or mixtures thereof are saponified in the presence of an inorganic salt with a concentrated aqueous solution of an alkali metal hydroxide in a liquid reaction medium comprising acetone. The organic salt or salts, i.e. soap or soaps, so formed are separated from the reaction medium and excess acetone is removed from the soap or soaps.

In a preferred process, the organic acid or ester thereof is first dissolved in acetone and the concentrated aqueous solution of the alkali metal hydroxide and the salt are then added with stirring. The liquid reaction mixture can be heated to a temperature of about 56° C., this being the boiling point of acetone, without application of super atmospheric pressure, and saponification allowed to proceed, preferably under reflux, until complete.

Soap is formed as a finely divided powdered solid in the reaction vessel and this can then be removed readily, for example by filtration, and then desolventised to remove acetone, for example by the application of warm air or steam, to yield dry finely divided soap powder.

The duration of the saponification process will generally depend on the temperature of the process and, when an organic acid ester is employed, on its Acid Value, which is a measure of the free fatty acid that can be present, particularly in organic acid esters of natural origin. The saponification reaction is generally exothermic, although it is preferred to apply gentle heat to enable the reaction to proceed at about 56° C. at normal atmospheric pressure, this being the boiling point of acetone. The process can alternatively be carried out at higher temperatures, provided that a pressure in excess of normal atmospheric pressure is applied.

In general, it can be stated that the duration of saponification is shorter when free fatty acids are employed than when their corresponding esters are used.

By way of example, it can be stated that for a sample of a lipid (organic acid ester) having an Acid Value of 99, saponification at 56° C. was complete in 30 minutes, whereas, for a sample of a different lipid having an Acid Value of 16, saponification was not complete until the reaction mixture had been heated at 56° C. for 3 hours. It follows that a high Acid Value is indicative of a short reaction time while a low Acid Value is indicative of a longer reaction time.

The soap obtained as a result of saponification will normally be precipitated as a fine crystalline white powder having an average particle size of a few microns.

The fine crystalline powdered soap will, as a result of separation from the liquid reaction medium and drying, generally adopt an agglomerated form having a particle size of from 0.05 mm 1 mm. In one example to be illustrated in greater detail later in this specification, the average particle size was between 0.2 and 0.3 mm.

The soap powder will generally be substantially anhydrous if the amount of alkali metal hydroxide employed for saponification is less than the stoichiometric amount. However, if it is desired to obtain soap powder containing sufficient moisture for preparing manufactured soap such as soap tablets, it is preferred to desolventise the soap powder, for example by steam treatment, so as to drive off any residual acetone, and at the same time to adjust the moisture of the soap powder to the desired level.

The soap powder produced by this method will generally be free from much of the colouring matter commonly present in commercial grades of animal fats and oils, the coloured matter remaining in solution in the liquid reaction medium, together with any unsaponifiable matter that may have been present in the starting material.

Typically, yields of soap obtained by the process of the invention can be as high as 90% or even higher.

The organic acid salts (soaps), prepared according to the invention as a finely divided powder, can be used in the manufacture of soap powders or flakes, such as those employed for fabric washing, or as a powder for use in mechanical dispensers, such as those employed in public washrooms. Alternatively, the finely divided soaps can be employed in the manufacture of shaped soap products such as soap tablets for use in personal or fabric washing.

It is also possible by acidification of the soaps to recover free organic acids (free fatty acids) for use, for example, in animal feeds, and for other purposes. As an example, the residue from the vacuum distillation of split tallow fatty acids, as a crude source of organic acids and esters, can be treated according to the invention to provide, after acidification, an inexpensive source of free fatty acids for use in the manufacture of animal feeds.

The organic acid lithium salts, also prepared according to the invention as a finely divided powder, can be used in the manufacture of lubricating greases.

The following examples illustrate the practice of this invention.

EXAMPLE 1

Preparation of Soap Powder from Triglycerides and Concentrated Sodium Hydroxide

To a solution of 50 g of a 50:50 mixture of tallow and coconut fats in 250 ml of acetone at a temperature of 56° C. was added 8.15 g of sodium hydroxide dissolved in 8.15 g of water, together with 2.5 g sodium chloride. The reaction was initiated by gentle warming. Once initiated, the reaction mixture was maintained at reflux temperature, with stirring, for a total of three hours. During this time, a layer of fine, white, solid, powdered material formed in the reaction vessel.

The solid material was collected by filtration and steamed (to remove acetone) to give a yield of about 90% of free-flowing sodium carboxylates (soaps) corresponding to the fatty acids in the starting material triglycerides.

Preparation of Bar Soap

The hydrated soap powder prepared in the above described manner can be used to form bar soaps in the conventional manner, having the following formulation:

| Ingredient | Weight % |
|---|---|
| Sodium soaps* | 89.75 |
| Coconut oil fatty acids | 7.0 |
| Sodium chloride | 1.0 |
| TiO$_2$ | 0.25 |
| Perfume, colouring, perfume stabiliser | 1.75 |

*Prepared as described above (containing about 10% by weight water).

A composition of the foregoing type can be extruded through a standard soap making extruder and formed into bars, using commercial bar soap processing techniques. An excellent soap bar product which compares favourably with commercially available soaps can be obtained.

EXAMPLE 2

Preparation of soap powder from low grade tallow 100 g reject tallow having a saponification value of 158 and an acid value of 84 and containing 2.5% by weight of unsaponifiable matter was dissolved in 500 ml of anhydrous acetone and heated to 56° C. under reflux. To this mixture was added 31 ml of 40% w/v aqueous sodium hydroxide solution, followed by 5 g of anhydrous sodium chloride over a five minute period to form a second liquid phase.

The mixture was stirred well and heated under reflux at about 56° C. for 30 minutes. A fine grained precipitate of soap was formed, together with a single liquid phase reaction medium containing water, glycerine, acetone, sodium chloride, unsaponifiables and a little unsaponified fat.

The soap powder was filtered and washed with 500 ml of acetone at 56° C. The soap grains so obtained were free flowing and contained less then 5% by weight of water.

The saponification and acid values of the fatty acids subsequently recovered from the soap grains (by acidification) were both 204, indicating that no esters precipitated with the soap.

The acetone reaction phase and wash phase were together evaporated until no acetone remained. The residual unsaponifiables contained 1.1 g of fatty acids, indicating a conversion of fatty matter of 98.8%.

In a similar experiment, from which sodium chloride was omitted, the corresponding conversion of fatty matter was 94%.

The soap powder so obtained was graded and the following spread of particle sizes recorded.

| % of soap powder | Particle size (mm) |
| --- | --- |
| 2.58 | 1 |
| 7.6 | 0.71 |
| 18.3 | 0.5 |
| 32.4 | 0.36 |
| 68.5 | 0.18 |
| 87.6 | 0.11 |
| 97.5 | 0.053 |
| 2.5 | 0.053 |

EXAMPLE 3

Preparation of Lithium Carboxylate

To a suspension of 50 g hydrogenated castor oil in 250 ml acetone at a temperature of 56° C. was added 3.9 g anhydrous lithium hydroxide dissolved in 26 ml water, together with 3 g sodium tripolyphosphate. The reaction was initiated by gentle heating. Once initiated, the reaction mixture was maintained at reflux temperature (56° C.), with stirring, for a total of 21 hours.

The product which precipitates from solution was isolated by vacuum filtration of the hot reaction mixture and solvent stripped in a vacuum desiccator. The product was solid, filterable lithium carboxylate, predominantly 12-hydroxystearate lithium salt.

This lithium salt (soap) can be used in the manufacture of industrial lubricants.

EXAMPLE 4

Preparation of Soap from Rice Bran Oil

A mixture of 20 g rice bran oil and 100 ml acetone was cooled from boiling point and filtered at 10° C. to remove waxes. The filtrate was heated to 56° C. and while stirring, 0.2 g sodium chloride were added, followed by 9.5 ml of 30% w/v sodium hydroxide over a 15 minute period. The reaction mixture was maintained at 56° C. for a further 15 minutes.

Soap powder precipitated from solution and was recovered by vacuum filtration. The powder was finally solvent stripped in a vacuum desiccator, and then deodorised by heating at 100° C. under vacuum. The soap powder retained its free-flowing characteristics on cooling.

The yield of soap obtained was 94%.

| Analysis of Rice Bran Oil Fatty Acids | |
| --- | --- |
| Fatty Acid | % w/w |
| $C_{12}$ | 0.5 |
| $C_{14}$ | 0.8 |
| $C_{16}$ | 22.8 |
| $C_{16:1}$ | 0.4 |
| $C_{18}$ | 2.4 |
| $C_{18:1}$ | 38.8 |
| $C_{18:2}$ | 29.1 |
| $C_{18:3}$ | 1.2 |
| $C_{20}$ | 0.8 |
| $C_{20:1}$ | 0.6 |
| $C_{21:1}$ | 0.3 |
| $C_{22}$ | 0.8 |
| $C_{24}$ | 1.5 |

Acid Value: 136
Saponification Value: 186
Unsaponifiables 5.2%

EXAMPLE 5

Preparation of Soap from Palm Oil 30 g palm oil was dispersed in 150 ml acetone and filtered. The filtrate was heated to 56° C. and 0.3 g sodium chloride was added, followed by 13 ml of 30% w/v sodium hydroxide over a 15 minute period. The reaction mixture was maintained at 56° C. for a further 1.75 hours.

The precipitated soap powder was recovered by vacuum filtration, washed with acetone and solvent stripped in a vacuum desicator. A substantial amount of yellow colour due to carotene was removed in the acetone phase and the remaining colour in the soap powder was further reduced by heating it in the anhydrous state to a temperature of 100° C. The free flowing characteristics of the soap powder were retained on cooling.

The yield of soap obtained was 99%.

| Analysis of Palm Oil Fatty Acids | |
| --- | --- |
| Fatty Acids | % w/w |
| $C_{12}$ | 0.1 |
| $C_{14}$ | 1.0 |
| $C_{16}$ | 45.7 |
| $C_{16:1}$ | 0.3 |
| $C_{17}$ | 0.1 |
| $C_{18}$ | 5.8 |
| $C_{18:1}$ | 38.7 |
| $C_{18:2}$ | 7.3 |
| $C_{20}$ | 0.4 |

-continued

Analysis of Palm Oil Fatty Acids

| Fatty Acids | % w/w |
|---|---|
| $C_{21:1}$ | 0.6 |

Acid Value: 18
Saponification Value: 197
Unsaponifiables: 0.9%

EXAMPLE 6

Preparation of Potassium Soap from Free Fatty Acids

To a suspension of 100 g PRIFAC 7920 in 100 g acetone at 56° C. was added 1 g sodium chloride, followed by 50 ml of 40% w/v potassium hydroxide over a 15 minute period. The precipitated soap was removed by vacuum filtration. The soap powder was fine grained in nature, anhydrous and white in colour.

PRIFAC 7920 is a main distillate of split tallow fatty acids: its fatty acid analysis is as follows:

| Fatty Acids | % w/w |
|---|---|
| $C_{14}$ | 2 |
| $C_{16}$ | 25 |
| $C_{16:1}$ | 3 |
| $C_{18}$ | 18 |
| $C_{18:1}$ | 44 |
| $C_{18:2}$ | 6 |
| $C_{18:3}$ | 1 |
| $C_{20}$ | 1 |

Saponification Value: 201-207
Acid Value: 200-206
Iodine Value: 50-60

What is claimed is:

1. A process for the preparation of an alkali metal salt of an organic carboxylic acid having from 6 to 24 carbon atoms in the molecule, which process comprises the steps of:
   (i) saponifying the corresponding organic carboxylic acid, its ester or mixtures thereof with a concentrated aqueous solution of alkali metal hydroxide in the presence of an inorganic salt of an alkali metal, in a liquid reaction medium comprising acetone;
   (ii) separating the organic salts from the reaction medium; and
   (iii) removing excess acetone from the organic salt.

2. The process of claim 1, wherein the concentrated aqueous solution of an alkali metal hydroxide comprises from 20% to 50% by weight of an alkali metal hydroxide selected from the group consisting of sodium hydroxide and potassium hydroxide.

3. The process of claim 1, wherein the concentrated aqueous solution of alkali metal hydroxide comprises from 10 to 17% by weight of lithium hydroxide.

4. The process of claim 1, wherein the inorganic salt is selected from the group consisting of alkali metal halides, sulphates, phosphates and mixtures thereof.

5. The process of claim 4, wherein the inorganic salt is selected from the group consisting of sodium sulphate, sodium chloride, sodium tripolyphosphate and mixtures thereof.

6. The alkali metal salt of an organic carboxylic acid, in the form of a substantially anhydrous powder having an average particle size of from 0.2 mm to 0.3 mm, prepared according to the process claimed in claim 1.

7. A process for the preparation of fatty acid soaps which comprises the steps of:
   (i) saponifying lipid material selected from the group consisting of free fatty acids, fats, oils and mixtures thereof with a concentrated aqueous solution of an alkali metal hydroxide comprising from 20% to 50% by weight of an alkali metal hydroxide selected from the group consisting of sodium hydroxide and potassium hydroxide, in the presence of an inorganic salt selected from the group consisting of alkali metal halides, sulphates and phosphates or mixtures thereof, in a liquid reaction medium comprising acetone;
   (ii) separating the fatty acid soaps from the reaction mixture; and
   (iii) removing excess acetone from the fatty acid soaps.

8. A process for the preparation of fatty acid soaps which comprises the steps of:
   (i) saponifying lipid material selected from the group consisting of free fatty acids, fats, oils and mixtures thereof with an aqueous solution comprising from 10% to 17% by weight of lithium hydroxide, in the presence of an inorganic salt selected from the group consisting of alkali metal halides, sulphates and phosphates or mixtures thereof, in a liquid reaction medium comprising acetone;
   (ii) separating the fatty acid soaps from the reaction medium; and
   (iii) removing excess acetone from the fatty acid soaps.

* * * * *